United States Patent
Zhou et al.

(10) Patent No.: US 11,474,125 B2
(45) Date of Patent: Oct. 18, 2022

(54) MEASUREMENTS INCORPORATING BRAKE LIGHT DETECTION

(71) Applicant: Pony AI Inc., Grand Cayman (KY)

(72) Inventors: Zixuan Zhou, Palo Alto, CA (US); Sinan Xiao, Mountain View, CA (US); Xiang Yu, Santa Clara, CA (US); Tiancheng Lou, Milpitas, CA (US); Jun Peng, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 916 days.

(21) Appl. No.: 16/193,080

(22) Filed: Nov. 16, 2018

(65) Prior Publication Data

US 2020/0158750 A1 May 21, 2020

(51) Int. Cl.
| | | |
|---|---|---|
| *G08G 1/04* | (2006.01) | |
| *G01P 15/00* | (2006.01) | |
| *G01S 17/58* | (2006.01) | |
| *G01S 17/88* | (2006.01) | |
| *G06V 20/58* | (2022.01) | |

(52) U.S. Cl.
CPC ............ *G01P 15/003* (2013.01); *G01S 17/58* (2013.01); *G01S 17/88* (2013.01); *G06V 20/584* (2022.01)

(58) Field of Classification Search
CPC ........ G01P 15/003; G01S 17/58; G01S 17/88; G06K 9/00825
See application file for complete search history.

(56) References Cited

U.S. PATENT DOCUMENTS

| | | |
|---|---|---|
| 7,190,260 B2 | 3/2007 | Rast |
| 7,653,215 B2 | 1/2010 | Stam |
| 2005/0063194 A1 | 3/2005 | Lys et al. |
| 2017/0050641 A1* | 2/2017 | Park ................ B60W 30/18109 |

\* cited by examiner

*Primary Examiner* — Mohamed Charioui
*Assistant Examiner* — Christine Y Liao
(74) *Attorney, Agent, or Firm* — Sheppard Mullin Richter & Hampton LLP (57) ABSTRACT

Systems, methods, and non-transitory computer readable media may be configured to calibrate sensor measurements based on detection of brake light. Acceleration information of a first vehicle may be obtained. The acceleration information may define an acceleration probability distribution of the first vehicle. Image information may be obtained. The image information may define an image of the first vehicle. Whether a brake light of the first vehicle is on or off may be determined based on the image of the first vehicle. Based on a determination that the brake light of the first vehicle is on, a calibrated acceleration probability distribution of the first vehicle may be generated based on the acceleration probability distribution of the first vehicle and a braking-calibration curve.

20 Claims, 8 Drawing Sheets

MEASUREMENTS INCORPORATING BRAKE LIGHT DETECTION

FIELD OF THE INVENTION

This disclosure relates to approaches for making measurements and detecting a vehicle or driver behavior based on detection of brake light.

BACKGROUND

Under conventional approaches, an autonomous vehicle may use sensors to detect positions, speeds, and/or accelerations of nearby vehicles. Such measurements may be used to determine how the autonomous vehicle may navigate around the vehicles. Inaccurate sensor measurements may result in dangerous or undesirable navigation of the autonomous vehicle.

SUMMARY

Various embodiments of the present disclosure may include systems, methods, and non-transitory computer readable media configured to calibrate sensor measurements based on brake light detection. Acceleration information of a first vehicle may be obtained. The acceleration information may define an acceleration probability distribution of the first vehicle. Image information of the first vehicle may be obtained. The image information may define an image of the first vehicle. Whether a brake light of the first vehicle is on or off may be determined based on the image of the first vehicle. Based on a determination that the brake light of the first vehicle is on, a calibrated acceleration probability distribution of the first vehicle may be generated based on the acceleration probability distribution of the first vehicle and a braking-calibration curve.

In some embodiments, the acceleration information may be determined based on a LIDAR sensor or a radar sensor. The acceleration information may be determined based on distance values and speed values of the first vehicle detected by the LIDAR sensor or the radar sensor. The LIDAR sensor or the radar sensor may be carried by a second vehicle behind the first vehicle. The image information may be generated by an image capture device of the second vehicle.

In some embodiments, generating the calibrated acceleration probability distribution of the first vehicle may include multiplying the acceleration probability distribution of the first vehicle by the braking-calibration curve.

In some embodiments, generating the calibrated acceleration probability distribution of the first vehicle further may include scaling a product of the acceleration probability distribution and the braking-calibration curve such that probabilities of the calibrated acceleration probability distribution sum to one.

In some embodiments, a location or a speed of the first vehicle may be determined based on the calibrated acceleration probability distribution of the first vehicle.

In some embodiments, based on a determination that the brake light of the first vehicle is off, the calibrated acceleration probability distribution of the first vehicle may be generated based on the acceleration probability distribution of the first vehicle and a non-braking-calibration curve.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In various implementations, a computing system may obtain acceleration information of a vehicle and image information of the vehicle. The acceleration information may define an acceleration probability distribution of the vehicle. The image information may define an image of the vehicle. Whether a brake light of the vehicle is on or off may be determined based on the image of the vehicle. Based on a determination that the brake light of the vehicle is on, a calibrated acceleration probability distribution of the vehicle may be generated based on the acceleration probability distribution of the vehicle and a braking-calibration curve. Based on a determination that the brake light of the vehicle is off, the calibrated acceleration probability distribution of the vehicle may be generated based on the acceleration probability distribution of the vehicle and a non-braking-calibration curve.

The acceleration information may be determined based on one or more sensors, such as a LIDAR sensor, a radar sensor, and/or other sensors. The acceleration information may be determined (e.g., generated) by the sensor(s) and/or determined based on information generated by the sensor(s). For example, the acceleration information may be determined by sensor(s) that detect acceleration values of the vehicle. As another example, the acceleration information may be determined based on distance values and speed values of the vehicle detected by the sensor(s). The sensor(s) may be carried by another vehicle behind the vehicle. The image information may be generated by one or more image capture devices of the other vehicle.

Generating the calibrated acceleration probability distribution of the vehicle may include multiplying the acceleration probability distribution of the vehicle by the braking-calibration curve. Generating the calibrated acceleration probability distribution of the vehicle further may include scaling a product of the acceleration probability distribution and the braking-calibration curve such that probabilities of the calibrated acceleration probability distribution sum to one. That is, the product of the acceleration probability distribution and the braking-calibration curve may be scaled such that the sum of all values of the calibrated acceleration probability equals one.

The calibrated acceleration probability distribution may be used to determine other information about the vehicle. For example, a location or a speed of the vehicle may be determined based on the calibrated acceleration probability distribution of the vehicle.

The approaches disclosed herein facilitates calibration of sensor measurements based on detection of brake lights. Based on detection of a brake light of a vehicle being turned on, a sensor measurement, such as an acceleration probability distribution, for the vehicle may be calibrated based on a braking-calibration curve. Based on detection of the brake light of the vehicle being turned off, the sensor measurement for the vehicle may be calibrated based on a non-braking-calibration curve. Such calibration of sensor measurements may provide for more accurate and/or more precise sensor measurements. Detection of brake light may also be used for detection of driver behavior, which may be used for modeling of driver behavior, modeling of vehicle movement, and/or other information.

While the disclosure is described herein with respect to calibrating sensor measurements for automobiles, this is merely for illustrative purposes and is not meant to be limiting. The approach disclosed herein may be used to calibrate sensor measurements for different types of vehicles (e.g., automobile, motorcycle, train, boat, ship, jet ski, submarine, airplane, remote-controlled vehicle). The approach disclosed herein may be used to calibrate sensor measurements of vehicles in in different types of locations (e.g., on the road, off the road, on a driving track, in the air, in the water).

Figure 1:
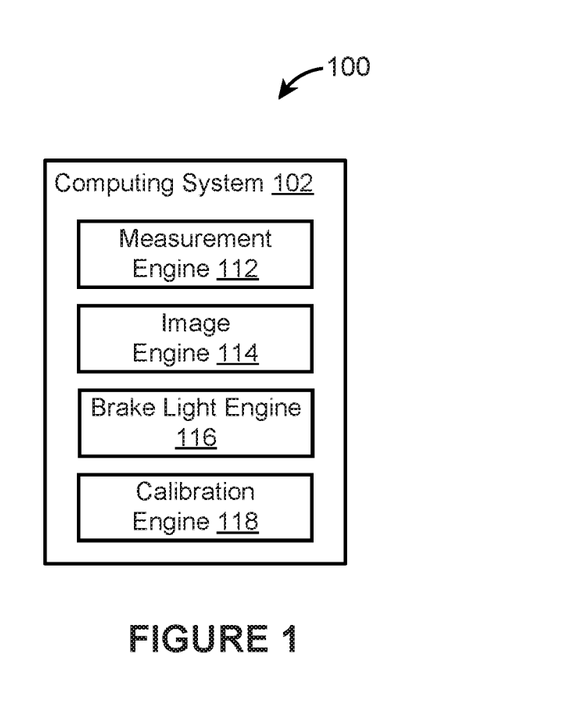
FIG. 1 illustrates an example environment for calibrating sensor measurements, in accordance with various embodiments.

FIG. 1 illustrates an example environment 100 for calibrating sensor measurements, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include a measurement engine 112, an image engine 114, a brake light engine 116, a calibration engine 118, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices. One or more portions of the computing system 102 may be implemented within a vehicle (e.g., autonomous vehicle). One or more portions of the computing system may be implemented remotely from a vehicle (e.g., server).

In various embodiments, the measurement engine 112 may be configured to obtain acceleration information of a vehicle. Obtaining acceleration information may include accessing, acquiring, analyzing, calculating, determining, examining, generating, identifying, loading, locating, opening, receiving, retrieving, reviewing, storing, and/or otherwise obtaining the acceleration information. Acceleration information may be obtained from hardware and/or software. Acceleration information may be obtained from a device that generated the acceleration information and/or other devices. For example, the measurement engine 112 may obtain acceleration information from a sensor that generated the acceleration information, a vehicle or a device including the sensor that generated the acceleration information, a communication device (e.g., router, server) that collects, conveys, and/or forwards the acceleration information generated by other devices, and/or from other locations. Acceleration information may be obtained from one or more storage locations. A storage location may refer to electronic storage located within the computing system 102 (e.g., integral and/or removable memory of the computing system 102), electronic storage coupled to the computing system 102, and/or electronic storage located remotely from the computing system 102 (e.g., electronic storage accessible to the computing system 102 through a network). Acceleration information may be stored within a single file or across multiple files.

Acceleration information may be determined (e.g., generated, calculated) based on one or more sensors. A sensor may refer to a device that detects and/or measures one or more physical properties. A sensor may record, indicate, and/or otherwise respond to the detected and/or measured physical propert(ies). For example, a sensor may include one or more of an image sensor, a vehicle speed sensor, a wheel speed sensor, a proximity sensor, an accelerometer, an inertial measurement unit, a LIDAR sensor, a location sensor, a motion sensor, a radar sensor, an engine control unit sensor, and/or other sensors. A sensor may be part of a vehicle, may be mechanically, electrically, and/or communicatively coupled to the vehicle, and/or may be remote from the vehicle. A sensor may be positioned within a vehicle and/or positioned outside the vehicle.

For example, acceleration information may be determined by a sensor carried by a vehicle, such as a LIDAR sensor or a radar sensor, that determines locations and/or movements of objects around the vehicle. As another example, acceleration information may be determined by a sensor positioned in the environment of a vehicle, such as a LIDAR sensor or a radar sensor attached to a light signal, a lamp post, and/or a structure, that determines locations and/or movements object around the sensor.

Acceleration information may be directly or indirectly determined based on one or more sensors. For example, acceleration information of a vehicle may be generated by a sensor that detected and/or measured one or more physical properties of the vehicle. For instance, acceleration information may be generated by one or more sensors that detected acceleration values (e.g., quantifying acceleration) of the vehicle. As another example, acceleration information of a vehicle may be calculated based on information generated by one or more sensors about the vehicle. For instance, acceleration information may be calculated based on distance values (e.g., quantifying distance between the vehicle and a sensor) and/or speed values (e.g., quantifying speed) of the vehicle detected by one or more sensors. That is, the distance values and/or speed values of the vehicle may be used to calculate the acceleration values of the vehicle. In some embodiments, obtaining acceleration information may include using information about the vehicle, such as distance values and/or speed values, to calculate the acceleration information.

Acceleration information of a vehicle may include values and/or other data that are indicative and/or descriptive of the acceleration of the vehicle. Acceleration information of a vehicle may include values and/or other data that are indicative and/or descriptive of the acceleration of the vehicle at one or more points in time and/or one or more durations in times. Acceleration information of a vehicle may define an acceleration probability distribution of the vehicle. An acceleration probability distribution may refer to a collection or a curve of probabilities that the vehicle is acceleration at various rates. An acceleration probability distribution may provide the probabilities that the vehicle is accelerating at various rates. Acceleration information may include values and/or other data that are indicative and/or descriptive of the probabilities that the acceleration of the vehicle is of certain values. An acceleration probability may be visualized as a curve, with the probabilities of the acceleration probably distribution summing to one.

Acceleration information of a vehicle may not be accurate or precise. For example, one or more sensors used to determine acceleration information of a vehicle may not be sufficiently precise or may provide inaccurate sensor readings. Relying on such acceleration information may be dangerous. For example, acceleration information may be used to determine the present or future location and/or the speed of the vehicle. Using inaccurate location and/or speed of a vehicle to provide navigation for other vehicle(s) may result in dangerous or undesirable navigation of other vehicle(s). For instance, acceleration information may be used to determine the position and/or speed of a vehicle in front of an autonomous vehicle. Using inaccurate location and/or speed of the vehicle to provide navigation for the autonomous vehicle may result in the autonomous vehicle crashing with or coming too close to the vehicle, and/or making other dangerous or undesirable movement(s).

In various embodiments, the image engine 114 may be configured to obtain image information of the vehicle. Obtaining image information may include accessing, acquiring, analyzing, calculating, determining, examining, generating, identifying, loading, locating, opening, receiving, retrieving, reviewing, storing, and/or otherwise obtaining the image information. Image information may be obtained from hardware and/or software. Image information may be obtained from a device (e.g., image capture device, such as a camera or an image sensor) that generated the image information and/or other devices. For example, the image engine 114 may obtain image information from one or more image capture devices that generated the image information, a vehicle or a device including the image capture device(s) that generated the image information, a communication device (e.g., router, server) that collects, conveys, and/or forwards the image information generated by other devices, and/or from other locations. Image information may be obtained from one or more storage locations. Image information may be stored within a single file or across multiple files.

Image information of a vehicle may define one or more images of the vehicle. An image of the vehicle may visually depict one or more portions of the vehicle. An image of the vehicle may visually depict one or more brake lights of the vehicle. An image of the vehicle captured while the vehicle is braking may visually depict one or more brake lights of the vehicle being on. An image of the vehicle captured while the vehicle is not braking (e.g., vehicle is accelerating, the vehicle is neither accelerating nor decelerating) may visually depict one or more brake lights of the vehicle being off.

In various embodiments, the brake light engine 116 may be configured to determine whether one or more brake lights of the vehicle are on or off. Whether a brake light of the vehicle is on or off may be determined based on one or more images of the vehicle. The brake light engine 116 may use one or more image analysis techniques to determine whether brake light(s) of the vehicle depicted in the image(s) are turned on or off. For example, the brake light engine 116 may use object recognition and/or pattern recognition to identify a brake light of the vehicle depicted in an image, and then determine whether the brake light is turned on based on the color, brightness, and/or intensities of the pixels corresponding to and/or near the brake light in the image. As another example, the brake light engine 116 may use a machine-learning tool that has been trained on images of brake lights that are turned on and off to determine whether the brake light(s) of the vehicle depicted in an image are turned on or off. In some embodiments, the brake light engine 116 may determine whether brake light(s) of the vehicle are on or off based on analysis of multiple images. That is, rather than relying on analysis of a single image, multiple images (e.g., multiple images of the vehicle taken from different perspectives, multiple images of the vehicle taken for a duration of time) may be analysis to determine whether the brake light(s) of the vehicle are on or off.

In some embodiments, the analysis of the image(s) may generate probabilit(ies) of the brake light(s) of the vehicle being on or off. The brake light engine 116 may determine whether a brake light of the vehicle is on or off based on whether the probability of the brake light being on or off satisfying a certain criteria. For example, the brake light engine 116 may determine that a brake light of the vehicle is on based on the probability of the brake light being on being greater than and/or equal to a brake-on threshold value. The brake-on threshold value may be set based on system defaults, set based on user input, set based on information relating to the image capture device that captured the image (e.g., different brake-on threshold values for different image capture device specifications), set based on the vehicle (e.g., different brake-on threshold values for different vehicle types), set based on conditions under which the image was captured (e.g., different brake-on threshold values for different environment of capture, different time of capture, different light conditions of capture), and/or other information. Other images analysis techniques and other determinations of brake lights of the vehicle being on or off are contemplated.

In various embodiments, the calibration engine 118 may be configured to generate a calibrated acceleration probability distribution of the vehicle. A calibrated acceleration probability distribution may refer to a collection or a curve of calibrated/adjusted probabilities that the vehicle is acceleration at various rates. A calibrated acceleration probability distribution may provide the calibrated/adjusted probabilities that the vehicle is accelerating at various rates. A calibrated acceleration probability distribution may be visualized as a curve, with the probabilities of the calibrated acceleration probably distribution summing to one. A calibrated acceleration probability distribution may provide more accurate and/or precise probabilities that the vehicle is accelerating at various rates than the acceleration probability distribution. That is, the calibration engine 118 may calibrate/adjust the acceleration probability distribution of the vehicle to improve the accuracy and/or precision of the detected acceleration probability distribution. In this way, the calibration engine 118 may calibrate sensor measurement based on the brake light detection, and may compensate for inaccurate or imprecise sensor detections/readings.

The calibration engine 118 may generate the calibrated acceleration probability distribution of the vehicle by adjusting the acceleration probability distribution of the vehicle. The calibration engine 118 may adjust the values of the acceleration probability distribution of the vehicle differently based on whether one or more brake lights of the vehicle have been determined (by the brake light engine 116) to be on or off. Based on a determination that the brake light(s) of the vehicle are on, the calibration engine 118 may generate the calibrated acceleration probability distribution of the vehicle based on the acceleration probability distribution of the vehicle, a braking-calibration curve, and/or other information. A braking-calibration curve may refer to a curve that is used to adjust an acceleration probability distribution of a vehicle that has been detected to be using its brake(s) based on its brake light(s).

The values of the braking-calibration curve may be defined based on an empirical distribution of acceleration for the vehicle and/or a non-empirical distribution of acceleration for the vehicle. An empirical distribution of acceleration for the vehicle for the braking-calibration curve may refer to observed probabilities of the vehicle's acceleration at various rates when using brakes. An empirical distribution of acceleration for the vehicle may be based on accelerations observed for the same vehicle, vehicles of the same type, and/or other vehicles when using brakes. A non-empirical distribution of acceleration for the vehicle may refer to non-observed probabilities of the vehicle's acceleration at various rates when using brakes. A non-empirical distribution of acceleration for the vehicle for the braking-calibration curve may include a simplified probability of the vehicle's acceleration at various rates when using brakes.

Based on a determination that the brake light(s) of the vehicle are off, the calibration engine 118 may generate the calibrated acceleration probability distribution of the vehicle based on the acceleration probability distribution of the vehicle, a non-braking-calibration curve, and/or other information. A non-braking-calibration curve may refer to a curve that is used to adjust an acceleration probability distribution of a vehicle that has been detected to not be using its brake(s) based on its brake light(s).

The values of the non-braking-calibration curve may be defined based on an empirical distribution of acceleration for the vehicle and/or a non-empirical distribution of acceleration for the vehicle. An empirical distribution of acceleration for the vehicle for the non-braking-calibration curve may refer to observed probabilities of the vehicle's acceleration at various rates when not using brakes. An empirical distribution of acceleration for the vehicle may be based on accelerations observed for the same vehicle, vehicles of the same type, and/or other vehicles when not using brakes. A non-empirical distribution of acceleration for the vehicle for the non-braking-calibration curve may refer to non-observed probabilities of the vehicle's acceleration at various rates when not using brakes. A non-empirical distribution of acceleration for the vehicle for the non-braking-calibration curve may include a simplified probability of the vehicle's acceleration at various rates when not using brakes.

Empirical and/or non-empirical distribution of acceleration for the vehicle for the braking-calibration curve and/or the non-braking-calibration curve may be characterized by one or more shapes. For example, an empirical distribution of acceleration for the vehicle may include a distribution of a bell-shape (normal distribution) and/or distribution(s) of other shapes. As another example, a non-empirical distribution of acceleration for the vehicle may include a distribution of a straight line/segment (simplified distribution) and/or distribution(s) of other shapes.

In some embodiments, the braking-calibration curve and/or the non-braking calibration curve used to generate the calibrated acceleration probability distribution of the vehicle may depend on one or more characteristics of the vehicle, one or more driving conditions, and/or other information. For example, the calibration engine 118 may select a particular braking/non-braking-calibration curve (or modify the braking/non-braking-calibration curve) for generation of the calibrated acceleration probability distribution based on one or more of the vehicle type (e.g., make, model, year), one or more components of the vehicle (e.g., tire type), one or more characteristics of the environment in which the vehicle is moving (e.g., road type, road curvature, road grade, road surface type, weather, wind speed, wind direction, rain/snow condition, water/ice on the road), and/or other information. Such selection and/or modification of the braking/non-braking-calibration curve may enable the calibration engine 118 to account for different accelerations of different vehicles/components of vehicles, different accelerations for different driving conditions, and/or other information.

In some embodiments, the calibration engine 118 may generate the calibrated acceleration probability distribution of the vehicle by multiplying the acceleration probability distribution of the vehicle with a calibration curve. Based on a determination that the brake light(s) of the vehicle are on, the calibration engine 118 may generate the calibrated acceleration probability distribution of the vehicle by multiplying the acceleration probability distribution of the vehicle with a braking-calibration curve. Based on a determination that the brake light(s) of the vehicle are off, the calibration engine 118 may generate the calibrated acceleration probability distribution of the vehicle by multiplying the acceleration probability distribution of the vehicle with a non-braking-calibration curve.

In some embodiments, the calibration engine 118 may generate the calibrated acceleration probability distribution of the vehicle by scaling a product of the acceleration probability distribution and a calibration curve (braking-calibration curve, non-braking calibration curve) such that the probabilities of the calibrated acceleration probability distribution sum to one. That is, the product of the acceleration probability distribution and the calibration curve may be scaled such that the sum of all values of the calibrated acceleration probability equals one.

In some embodiments, the calibration engine 118 may modify and/or re-generate the calibrated acceleration probability distribution of the vehicle based on detecting that the brake-light on/off determination is wrong. The calibration engine 118 may detect that the brake-light on/off determination gave a false positive (false detection that the brake light was on) or a false negative (false detection that the brake light was off). The calibration engine 118 may detect that the brake-light on/off determination is wrong based on the observed acceleration of the vehicle being different from what would be expected based on the brake light on/off determination. For example, if the brake light of the vehicle was determined to be on and yet the observed acceleration of the vehicle is positive (e.g., high acceleration), then the brake light on determination may be detected to be a false positive and the calibration acceleration probability distribution may be modified and/or re-generated based on the non-braking-calibration curve.

The calibrated acceleration probability distribution may be used to determine other information about the vehicle. For example, one or more locations of the vehicle at one or more times may be determined (e.g., estimated) based on the calibrated acceleration probability distribution of the vehicle. As another example, one or more speeds of the vehicle at one or more times may be determined (e.g., estimated) based on the calibrated acceleration probability distribution of the vehicle. Use of the calibrated acceleration probability distribution may enable more accurate and/or precise determination (e.g., estimation) of the location(s) and/or speed(s) of the vehicle than use of non-calibrated acceleration probability distribution. Such information may be used to provide navigation for a vehicle, such as an autonomous vehicle. For example, the calibrated acceleration probability distribution may be used to determine location(s) and/or speed(s) of vehicle(s) in front of and/or around the autonomous vehicle, and the location(s) and/or speeds of the vehicle(s) may be used to determine how the autonomous vehicle should navigate with respect to the vehicle(s).

Figure 2:
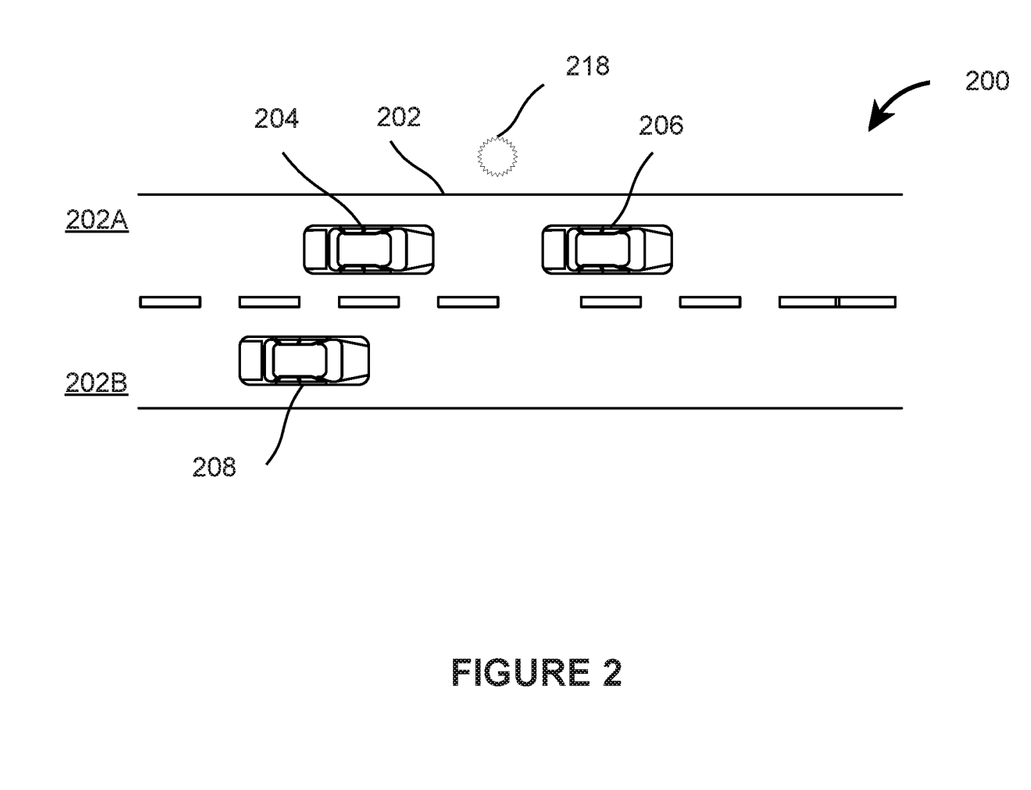
FIG. 2 illustrates an example scenario for calibrating sensor measurements, in accordance with various embodiments.

FIG. 2 illustrates an example scenario 200 for calibrating sensor measurements, in accordance with various embodiments. The scenario 200 may include a road 202, which may be divided into a lane 202A and a lane 202B. Vehicles 204, 206 may be on the lane 202A. A vehicle 208 may be on the lane 202B. A sensor 218 may be positioned on the side of the road 202. One or more sensors may be carried by the vehicles 204, 208. The sensor 218 and/or the sensor(s) of the vehicles 204, 208 may include a LIDAR sensor, a radar sensor, an image capture device, an image sensor, and/or other sensor(s). For example, a LIDAR sensor may be carried by the vehicle 204. The LIDAR sensor of the vehicle 204 may be used to determine acceleration information of the vehicle 206. The acceleration information of the vehicle 206 may define an acceleration probability distribution of the vehicle 206.

The acceleration probability distribution of the vehicle 206 may not be accurate or precise. To calibrate the acceleration probability distribution of the vehicle 206, one or more image capture devices/image sensors in the scenario 200 may be used to determine whether the brake lights of the vehicle 206 are on. For example, an image capture device/image sensor carried by the vehicle 204, carried be the vehicle 206, and/or part of the sensor 218 may be used capture an image of the vehicle 206 and the image may be analyzed to determine whether the brake lights of the vehicle 206 are on.

Based on a determination that the brake lights of the vehicle 206 are on, a calibrated acceleration probability distribution of the vehicle 206 may be generated based on the acceleration probability distribution of the vehicle 206, a braking-calibration curve, and/or other information. Based on a determination that the brake lights of the vehicle 206 are off, a calibrated acceleration probability distribution of the vehicle 206 may be generated based on the acceleration probability distribution of the vehicle 206, a non-braking-calibration curve, and/or other information.

The calibrated acceleration probability distribution of the vehicle 206 may be used to determine other information about the vehicle 206. For example, location(s) and/or speed(s) of the vehicle 206 in the future may be estimated based on the calibrated acceleration probability distribution of the vehicle 206. Such estimated location(s) and/or speed(s) of the vehicle 206 may be used to provide navigation for the vehicle 204 and/or the vehicle 208.

Figure 3:
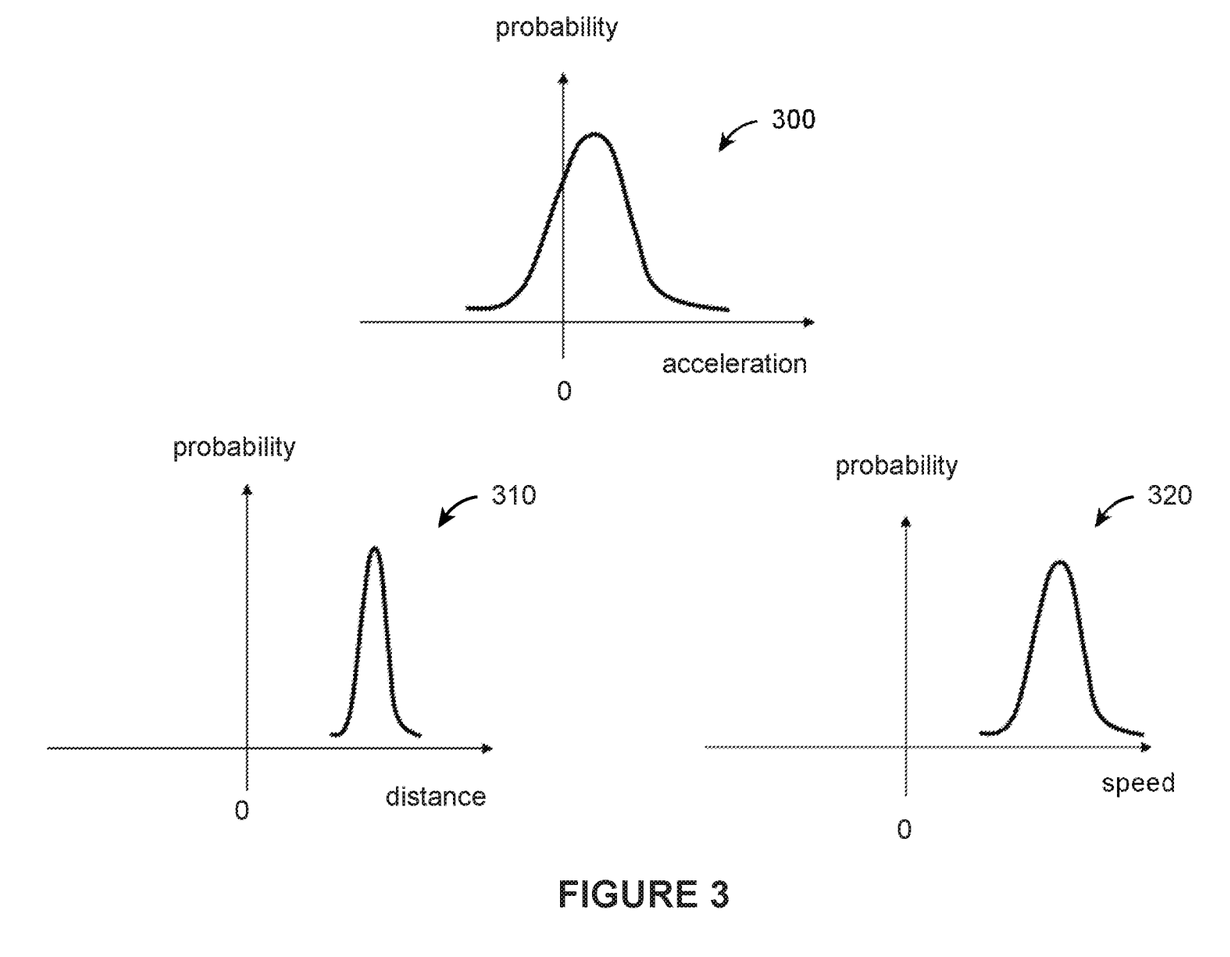
FIG. 3 illustrates example probability distributions for distance, speed, and acceleration, in accordance with various embodiments.

FIG. 3 illustrates an example acceleration probability distribution 300, an example distance probability distribution 310, and an example speed probability distribution 320. The acceleration probability distribution 300 may provide the probabilities that a vehicle is accelerating at various rates. For example, the acceleration probability distribution 300 may provide the probabilities that a vehicle in front of another vehicle is accelerating at various rates. The distance probability distribution 310 may provide the probabilities that a vehicle is at various distances from a sensor/device carrying the sensor. For example, distance probability distribution 310 may provide the probabilities of various distances between the vehicle and another vehicle behind the vehicle. The speed probability distribution 320 may provide the probabilities that a vehicle is moving at various rates. For example, the speed probability distribution 320 may provide the probabilities that a vehicle in front of another vehicle is moving at various rates. In some embodiments, one of the probability distributions 300, 310, 320 may be determined based on one or more of the other probability distributions. For example, the acceleration probability distribution 300 may be determined based on the distance probability distribution 310 and/or the speed probability distribution 320.

Figure 4A:
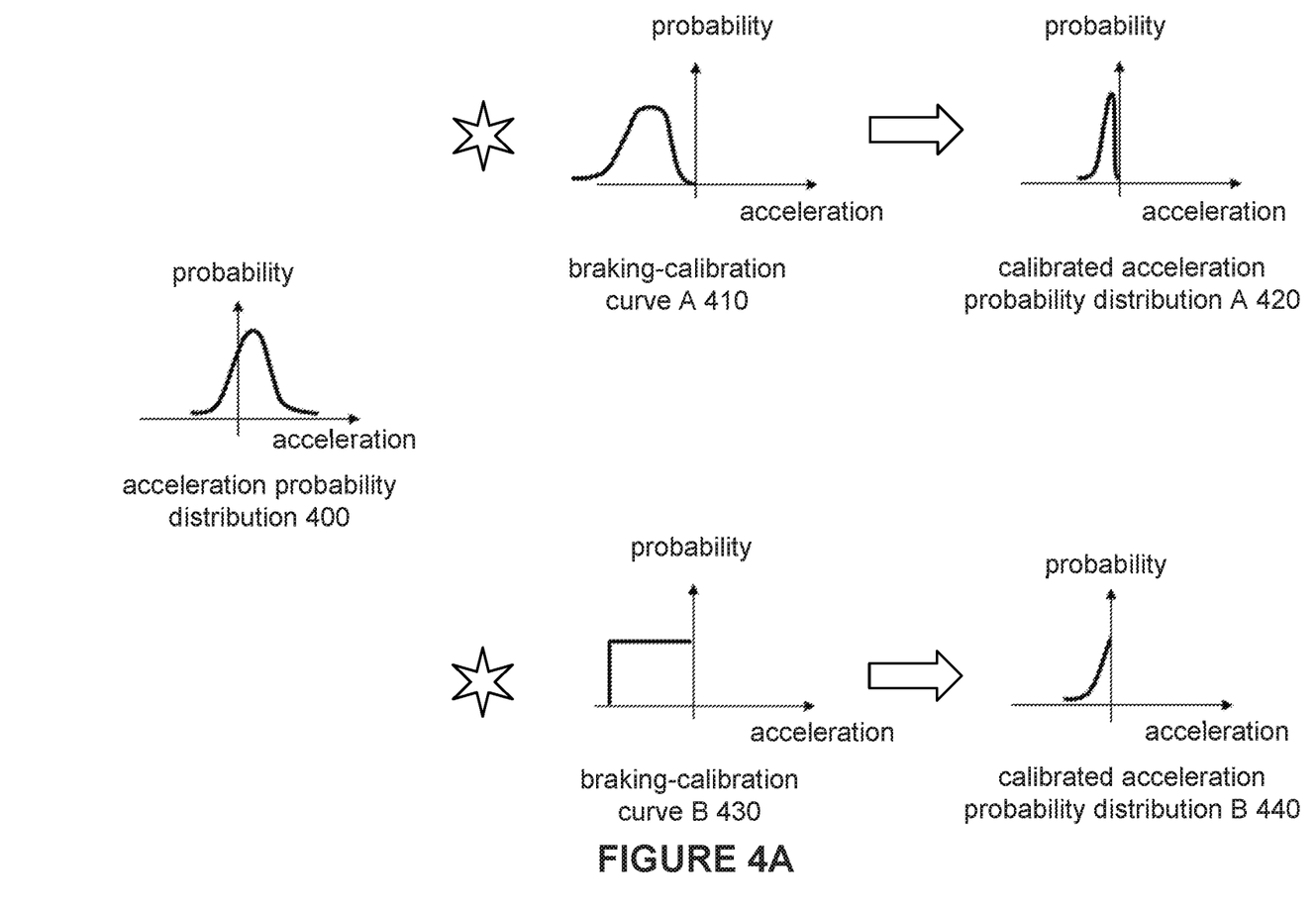
FIG. 4A illustrates example calibrations of acceleration probability distribution based on braking-calibration curves, in accordance with various embodiments.

FIG. 4A illustrates example calibrations of an acceleration probability distribution 400 based on a braking-calibration curve A 410 and a braking-calibration curve B 430, in accordance with various embodiments. The acceleration probability distribution 400 may provide the probabilities that a vehicle is accelerating at various rates. The acceleration probability distribution 400 may be calibrated as shown in FIG. 4A based on a determination that one or more brake lights of the vehicle are on.

Based on the brake light(s) of the vehicle being determined to be on, the acceleration probability distribution 400 may be multiplied with the braking-calibration curve A 410 and/or the braking-calibration curve B 430. The values of the braking-calibration curve A 410 may be defined based on an empirical/normal distribution of acceleration for the vehicle when using brake(s). The values of the braking-calibration curve B 430 may be defined based on a non-empirical/simplified distribution of acceleration for the vehicle when using brake(s).

The multiplication of the acceleration probability distribution 400 with the braking-calibration curve A 410 may generate a calibrated acceleration probability distribution A 420. The multiplication of the acceleration probability distribution 400 with the braking-calibration curve B 430 may generate a calibrated acceleration probability distribution B 440 (truncated version of the acceleration probability distribution 400).

Figure 4B:
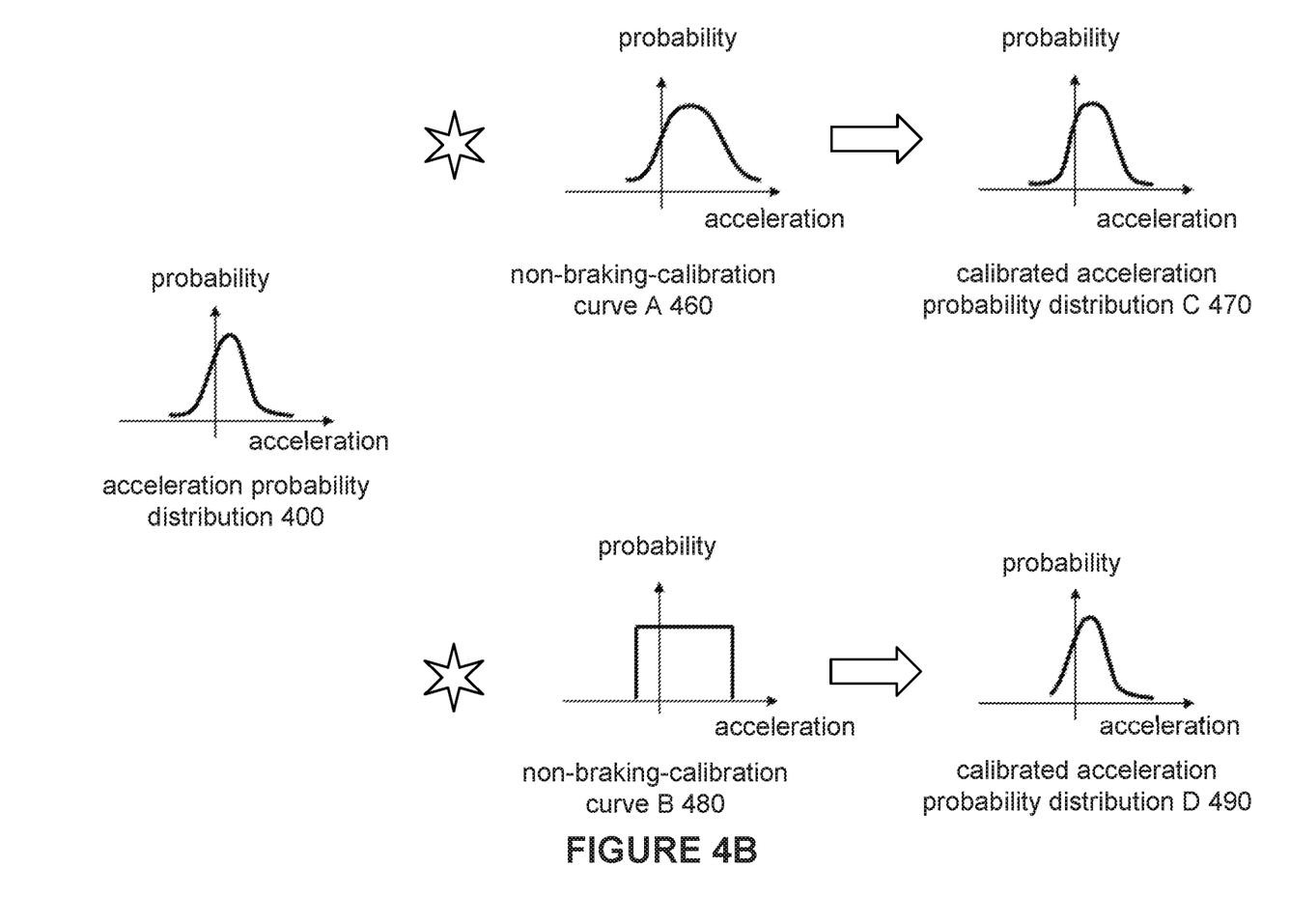
FIG. 4B illustrates example calibrations of acceleration probability distribution based on non-braking-calibration curves, in accordance with various embodiments.

FIG. 4B illustrates example calibrations of acceleration probability distribution 400 based on a non-braking-calibration curve A 460 and a non-braking-calibration curve B 480, in accordance with various embodiments. The acceleration probability distribution 400 may provide the probabilities that a vehicle is accelerating at various rates. The acceleration probability distribution 400 may be calibrated as shown in FIG. 4B based on a determination that one or more brake lights of the vehicle are off.

Based on the brake light(s) of the vehicle being determined to be off, the acceleration probability distribution 400 may be multiplied with the non-braking-calibration curve A 460 and/or the non-braking-calibration curve B 480. The values of the non-braking-calibration curve A 460 may be defined based on an empirical/normal distribution of acceleration for the vehicle when not using brake(s). The values of the non-braking-calibration curve B 480 may be defined based on a non-empirical/simplified distribution of acceleration for the vehicle when not using brake(s).

The multiplication of the acceleration probability distribution 400 with the non-braking-calibration curve A 460 may generate a calibrated acceleration probability distribution C 470. The multiplication of the acceleration probability distribution 400 with the non-braking-calibration curve B 480 may generate a calibrated acceleration probability distribution D 490 (truncated version of the acceleration probability distribution 400).

Figure 4C:
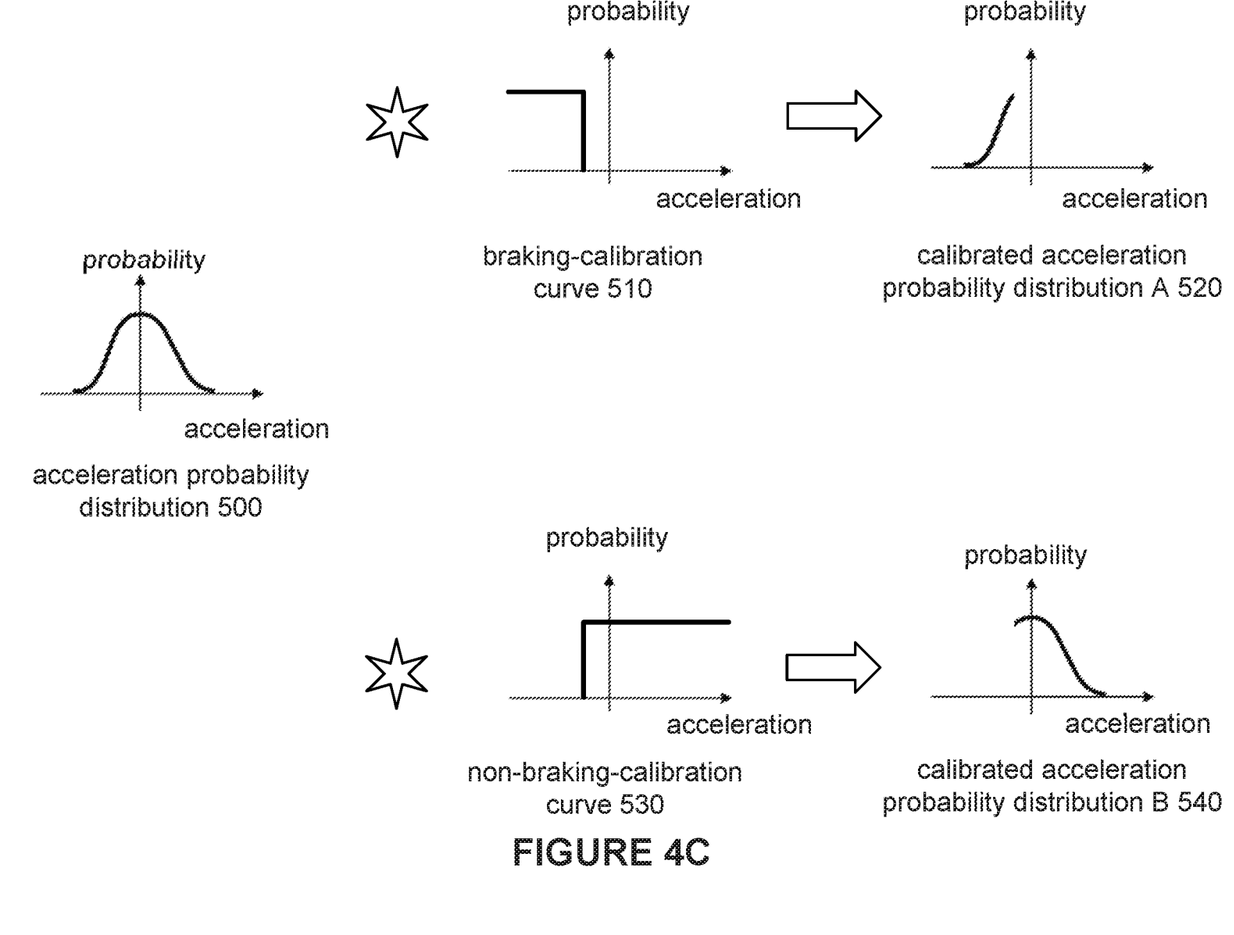
FIG. 4C illustrates example calibrations of acceleration probability distribution based on a braking-calibration curve and a non-braking-calibration curve, in accordance with various embodiments.

FIG. 4C illustrates example calibrations of acceleration probability distribution 500 based on a braking-calibration curve 510 and a non-braking-calibration curve 530, in accordance with various embodiments. The acceleration probability distribution 500 may provide the probabilities that a vehicle is accelerating at various rates. The acceleration probability distribution 500 may be calibrated as shown in FIG. 4C based on a determination that one or more brake lights of the vehicle are on using the braking-calibration curve 510 and based on a determination that one or more brake lights of the vehicle are off using the non-braking-calibration curve 530.

Based on the brake light(s) of the vehicle being determined to be on, the acceleration probability distribution 500 may be multiplied with the braking-calibration curve 510. The values of the braking-calibration curve 510 may be defined based on a non-empirical/simplified distribution of acceleration for the vehicle when using brake(s). The multiplication of the acceleration probability distribution 500 with the braking-calibration curve 510 may generate a calibrated acceleration probability distribution A 520 (truncated version of the acceleration probability distribution 500).

Based on the brake light(s) of the vehicle being determined to be off, the acceleration probability distribution 500 may be multiplied with the non-braking-calibration curve 530. The values of the non-braking-calibration curve 530 may be defined based on a non-empirical/simplified distribution of acceleration for the vehicle when not using brake(s). The multiplication of the acceleration probability distribution 500 with the non-braking-calibration curve 530 may generate a calibrated acceleration probability distribution B 540 (truncated version of the acceleration probability distribution 500).

In some embodiments, tracking of the vehicle may be performed using a particle filter, a Kalman filter (e.g., EKF, VKF, etc.), and/or other filters. Use of a Kalman filter may require use of a Gaussian distribution as input. Moment matching may be used to convert the calibrated acceleration probability distribution A 520 and the calibrated acceleration probability distribution B 540 into a Gaussian distribution.

Figure 5:
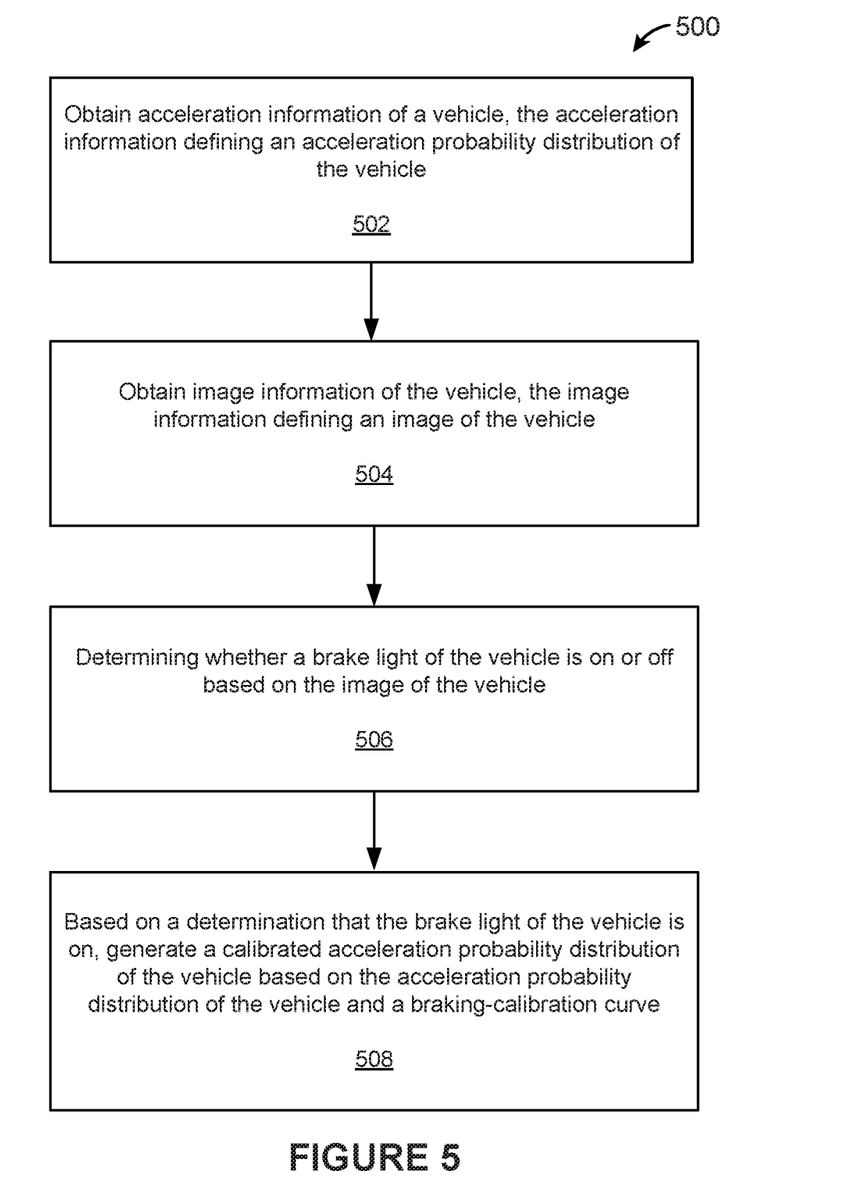
FIG. 5 illustrates a flowchart of an example method, in accordance with various embodiments.

FIG. 5 illustrates a flowchart of an example method 500, according to various embodiments of the present disclosure. The method 500 may be implemented in various environments including, for example, the environment 100 of FIG. 1. The operations of method 500 presented below are intended to be illustrative. Depending on the implementation, the example method 500 may include additional, fewer, or alternative steps performed in various orders or in parallel. The example method 500 may be implemented in various computing systems or devices including one or more processors.

At block 502, acceleration information of a vehicle may be obtained. The acceleration information may define an acceleration probability distribution of the vehicle. At block 504, image information of the vehicle may be obtained. The image information may define an image of the vehicle. At block 506, whether a brake light of the vehicle is on or off may be determined based on the image of the vehicle. At block 508, based on a determination that the brake light of the vehicle is on, a calibrated acceleration probability distribution of the vehicle may be generated based on the acceleration probability distribution of the vehicle and a braking-calibration curve.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
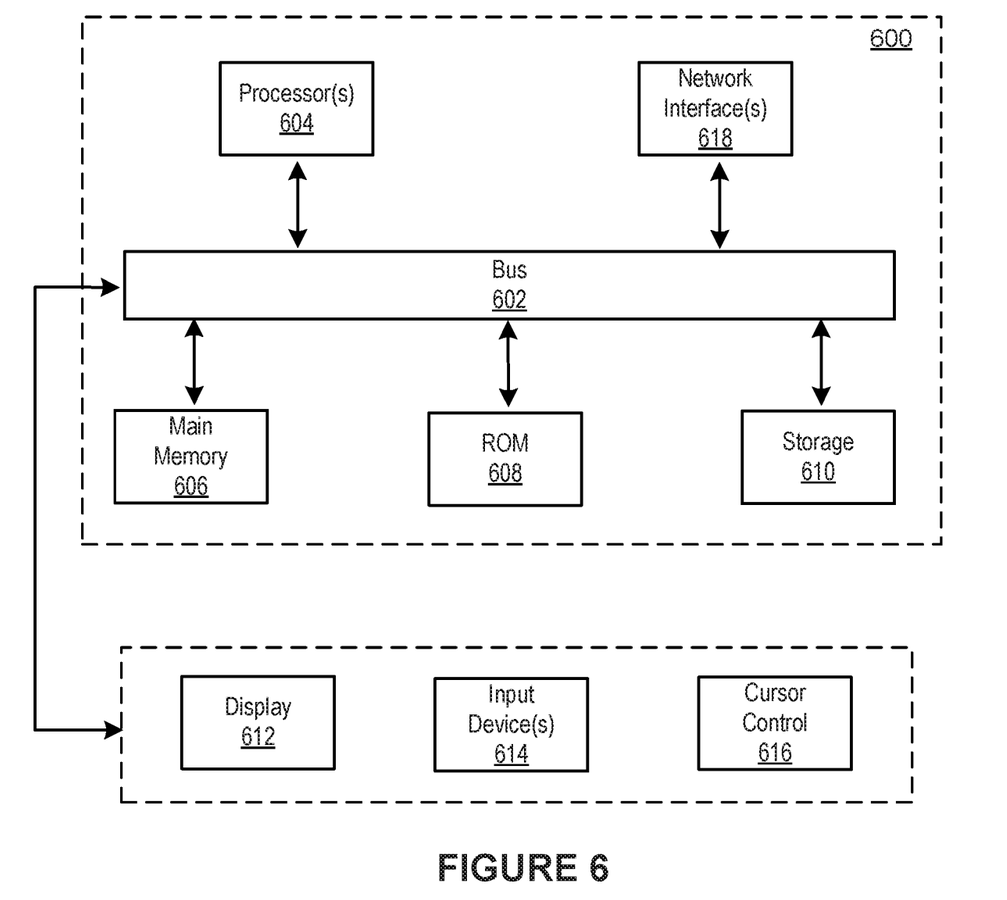
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
obtaining acceleration information of a first vehicle, the acceleration information defining an acceleration probability distribution of the first vehicle;
obtaining image information of the first vehicle, the image information defining an image of the first vehicle;
determining whether a brake light of the first vehicle is on or off based on the image of the first vehicle;
upon a determination that the brake light of the first vehicle is on, determining a location of the first vehicle based on the acceleration probability distribution and a braking-calibration curve;
generating, based on the determined location of the first vehicle, navigation instructions for a second vehicle; and
populating the generated navigation instructions on a display.

2. The system of claim 1, wherein the acceleration information is determined based on a LIDAR sensor or a radar sensor.

3. The system of claim 2, wherein the acceleration information is determined based on distance values and speed values of the first vehicle detected by the LIDAR sensor or the radar sensor.

4. The system of claim 3, wherein the LIDAR sensor or the radar sensor is carried by the second vehicle behind the first vehicle.

5. The system of claim 4, wherein the image information is generated by an image capture device of the second vehicle.

6. The system of claim 1, wherein the instructions, when executed by the one or more processors, further cause the system to perform:
generating, based on the determination that the brake light of the first vehicle is on, a calibrated acceleration probability distribution of the first vehicle based on the acceleration probability distribution of the first vehicle and the braking-calibration curve, wherein generating the calibrated acceleration probability distribution of the first vehicle includes multiplying the acceleration probability distribution of the first vehicle by the braking-calibration curve.

7. The system of claim 6, wherein generating the calibrated acceleration probability distribution of the first vehicle further includes scaling a product of the acceleration probability distribution and the braking-calibration curve such that probabilities of the calibrated acceleration probability distribution sum to one.

8. The system of claim 6, wherein the location or a speed of the first vehicle is determined based on the calibrated acceleration probability distribution of the first vehicle.

9. The system of claim 1, wherein the instructions, when executed by the one or more processors, further cause the system to perform:
generating, based on a determination that the brake light of the first vehicle is off, a calibrated acceleration probability distribution of the first vehicle based on the acceleration probability distribution of the first vehicle and a non-braking-calibration curve.

10. A method implemented by a computing system including one or more processors and storage media storing machine-readable instructions, wherein the method is performed using the one or more processors, the method comprising:
obtaining acceleration information of a first vehicle, the acceleration information defining an acceleration probability distribution of the first vehicle;
obtaining image information of the first vehicle, the image information defining an image of the first vehicle;
determining whether a brake light of the first vehicle is on or off based on the image of the first vehicle;
upon a determination that the brake light of the first vehicle is on, determining a location of the first vehicle based on the acceleration probability distribution and a braking-calibration curve;
generating, based on the determined location of the first vehicle, navigation instructions for a second vehicle; and populating the generated navigation instructions on a display.

11. The method of claim 10, wherein the acceleration information is determined based on a LIDAR sensor or a radar sensor.

12. The method of claim 11, wherein the acceleration information is determined based on distance values and speed values of the first vehicle detected by the LIDAR sensor or the radar sensor.

13. The method of claim 12, wherein the LIDAR sensor or the radar sensor is carried by the second vehicle behind the first vehicle.

14. The method of claim 13, wherein the image information is generated by an image capture device of the second vehicle.

15. The method of claim 10, further comprising:
generating, based on the determination that the brake light of the first vehicle is on, a calibrated acceleration probability distribution of the first vehicle based on the acceleration probability distribution of the first vehicle and the braking-calibration curve, wherein generating the calibrated acceleration probability distribution of the first vehicle includes multiplying the acceleration probability distribution of the first vehicle by the braking-calibration curve.

16. The method of claim 15, wherein generating the calibrated acceleration probability distribution of the first vehicle further includes scaling a product of the acceleration probability distribution and the braking-calibration curve such that probabilities of the calibrated acceleration probability distribution sum to one.

17. The method of claim 15, wherein the location or a speed of the first vehicle is determined based on the calibrated acceleration probability distribution of the first vehicle.

18. The method of claim 10, further comprising:
generating, based on a determination that the brake light of the first vehicle is off, a the calibrated acceleration probability distribution of the first vehicle based on the acceleration probability distribution of the first vehicle and a non-braking-calibration curve.

19. A non-transitory computer readable medium comprising instructions that, when executed, cause one or more processors to perform:
obtaining acceleration information of a first vehicle, the acceleration information defining an acceleration probability distribution of the first vehicle;
obtaining image information of the first vehicle, the image information defining an image of the first vehicle;
determining whether a brake light of the first vehicle is on or off based on the image of the first vehicle;
upon a determination that the brake light of the first vehicle is on, determining a location of the first vehicle based on the acceleration probability distribution and a braking-calibration curve;
generating, based on the determined location of the first vehicle, navigation instructions for a second vehicle; and populating the generated navigation instructions on a display.

20. The non-transitory computer readable medium of claim 19, further comprising:
generating, based on the determination that the brake light of the first vehicle is on, a calibrated acceleration probability distribution of the first vehicle based on the acceleration probability distribution of the first vehicle and the braking-calibration curve, wherein generating the calibrated acceleration probability distribution of the first vehicle includes multiplying the acceleration probability distribution of the first vehicle by the braking-calibration curve.

* * * * *